(12) United States Patent  
Takebayashi

(10) Patent No.: US 11,934,994 B2  
(45) Date of Patent: Mar. 19, 2024

(54) LOAD RECEIVING VEHICLE

(71) Applicant: HONDA MOTOR CO., LTD., Tokyo (JP)

(72) Inventor: Ryo Takebayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/861,133

(22) Filed: Jul. 8, 2022

(65) Prior Publication Data

US 2022/0343277 A1 Oct. 27, 2022

Related U.S. Application Data

(63) Continuation of application No. 16/666,608, filed on Oct. 29, 2019, now Pat. No. 11,416,808.

(30) Foreign Application Priority Data

Nov. 2, 2018 (JP) .................................. 2018-207583

(51) Int. Cl.
| | |
|---|---|
| *G06Q 10/083* | (2023.01) |
| *B60Q 9/00* | (2006.01) |
| *B60R 25/24* | (2013.01) |
| *G05D 1/00* | (2006.01) |
| *G07C 9/00* | (2020.01) |

(52) U.S. Cl.
CPC ........... *G06Q 10/0838* (2013.01); *B60Q 9/00* (2013.01); *B60R 25/24* (2013.01); *G05D 1/0088* (2013.01); *G07C 9/00817* (2013.01); *G07C 9/00896* (2013.01); *G07C 2009/0092* (2013.01)

(58) Field of Classification Search
CPC ........... B60Q 9/00; B60R 25/20; B60R 25/24; G05D 1/0088; G05D 2201/0213; G06Q 10/0832; G06Q 10/0838; G07C 9/00817; G07C 9/00896; G07C 2009/0092
See application file for complete search history.

(56) References Cited

U.S. PATENT DOCUMENTS

| | | |
|---|---|---|
| 9,916,558 B2 | 3/2018 | Wiechers |
| 10,661,753 B2 | 5/2020 | Nakajima et al. |
| 11,077,829 B2 | 8/2021 | Nakajima et al. |
| 11,148,640 B2 | 10/2021 | Kaneichi et al. |

(Continued)

FOREIGN PATENT DOCUMENTS

| | | |
|---|---|---|
| JP | 2004-339737 A | 12/2004 |
| JP | 2006-206225 A | 8/2006 |
| JP | 2009-190560 A | 8/2009 |

OTHER PUBLICATIONS

Japanese Office Action for Japanese Patent Application No. 2021-178039 dated Oct. 21, 2022 (partially translated).

*Primary Examiner* — Omeed Alizada  
(74) *Attorney, Agent, or Firm* — Thomas| Horstemeyer, LLP

(57) ABSTRACT

According to the present invention, a load receiving vehicle is provided. The load receiving vehicle comprises a storage unit usable as a receiving place of a delivery article; a lock control unit capable of controlling lock and unlock of a door of the storage unit; and a communication unit, wherein if the communication unit receives delivery schedule information representing a delivery schedule to the load receiving vehicle, information based on the delivery schedule information is provided to a driver.

8 Claims, 8 Drawing Sheets

(56) References Cited

U.S. PATENT DOCUMENTS

| | | |
|---|---|---|
| 11,195,246 B2 | 12/2021 | Qiu et al. |
| 11,263,579 B1 | 3/2022 | Siegel et al. |
| 11,377,070 B2 | 7/2022 | Kaneichi et al. |
| 2009/0009983 A1* | 1/2009 | Eich ................ B60K 37/02 362/489 |
| 2017/0024688 A1 | 1/2017 | Wiechers |
| 2018/0093614 A1* | 4/2018 | Hamaguchi ............ B60R 3/02 |
| 2019/0122325 A1* | 4/2019 | Qiu ................... B60N 3/104 |
| 2019/0176754 A1 | 6/2019 | Kaneichi et al. |
| 2019/0176755 A1 | 6/2019 | Nakajima et al. |
| 2019/0205831 A1* | 7/2019 | Kanaoka ............. G06Q 50/30 |
| 2019/0287065 A1 | 9/2019 | Shintani et al. |
| 2020/0238951 A1 | 7/2020 | Nakajima et al. |
| 2021/0261093 A1 | 8/2021 | Kaneichi et al. |
| 2022/0067479 A1 | 3/2022 | Lee et al. |

\* cited by examiner

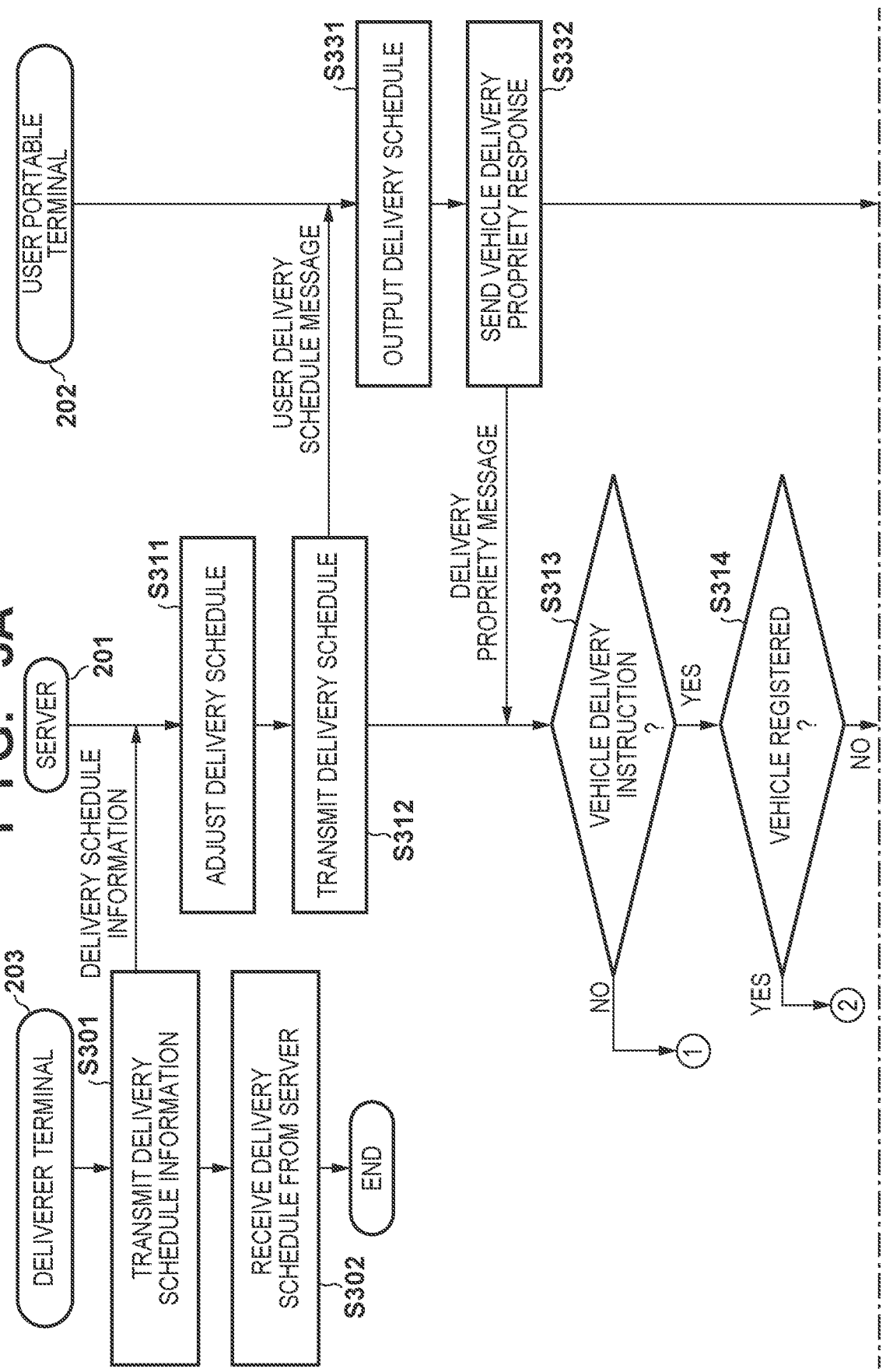

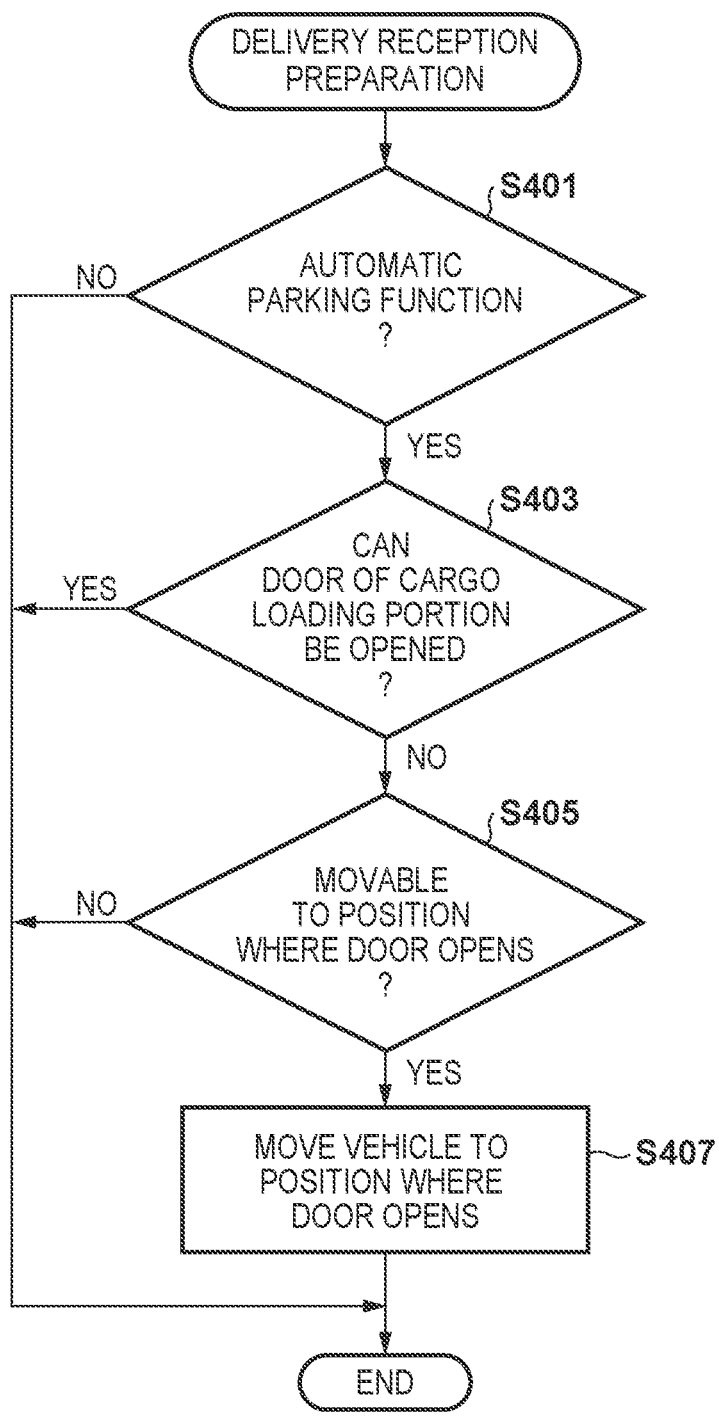

LOAD RECEIVING VEHICLE

CROSS-REFERENCE TO RELATED APPLICATION(S)

This application is a continuation of, and claims priority to and the benefit of, U.S. patent application Ser. No. 16/666,608, entitled "Load Receiving Vehicle" filed on Oct. 29, 2019, which claims priority to and the benefit of Japanese Patent Application No. 2018-207583 filed on Nov. 2, 2018, where both of these applications are incorporated herein by reference in their entirety.

BACKGROUND OF THE INVENTION

Field of the Invention

The present invention relates to a load receiving vehicle that stores a delivery article and, more particularly, to a load receiving vehicle capable of receiving a delivery article and safely storing it without an intervention of a person.

Description of the Related Art

There is proposed a technique of using a vehicle as a receiving container to reliably deliver a delivery article even if a recipient is absent (for example, Japanese Patent Laid-Open No. 2006-206225). According to the Japanese Patent Laid-Open No. 2006-206225, a load receiving vehicle is provided with an in-vehicle communication device and a trunk control device. When delivering a delivery article, a commercial communication device provided in the vehicle of a home delivery trader performs mutual authentication with the load receiving vehicle, and the delivery article is stored in a trunk.

However, to store the load in the trunk, a space to prevent interference between the lid of the trunk and an obstacle or a space for the work of the deliverer is needed. For this reason, if the vehicle is parking in a place where the necessary space is not ensured, a situation may occur in which the load is delivered but cannot be put in the trunk.

SUMMARY OF THE INVENTION

The present invention provides a load receiving vehicle capable of safely and reliably receiving a delivery article even if a recipient is absent.

A load receiving vehicle according to the present invention has the following arrangement. That is, according to an aspect of the present invention, there is provided a load receiving vehicle comprising: a storage unit usable as a receiving place of a delivery article; a lock control unit capable of controlling lock and unlock of a door of the storage unit; and a communication unit, wherein if the communication unit receives delivery schedule information representing a delivery schedule to the load receiving vehicle, information based on the delivery schedule information is provided to a driver.

According to the present invention, it is possible to provide a load receiving vehicle capable of safely and reliably receiving a delivery article even if a recipient is absent.

BRIEF DESCRIPTION OF THE DRAWINGS

FIGS. 3A and 3B are sequence charts of a delivery preparation procedure in the delivery system;

FIG. 4 is a flowchart of a delivery acceptance preparation procedure by a load receiving vehicle according to the second embodiment;

DESCRIPTION OF THE EMBODIMENTS

Figure 1:
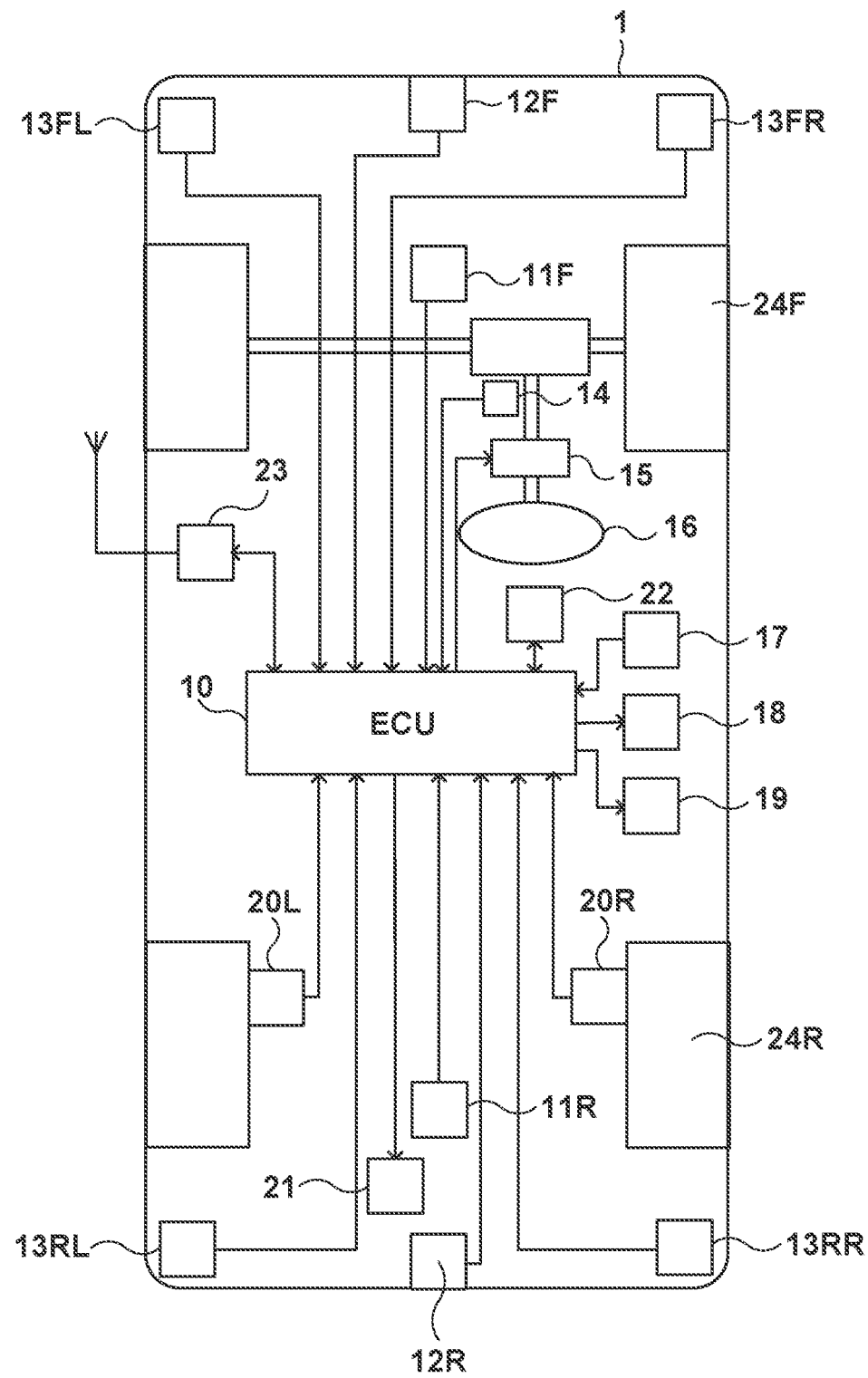
FIG. 1 is a view showing an example of the arrangement of a load receiving vehicle.

Hereinafter, embodiments will be described in detail with reference to the accompanying drawings. It should be noted that the following embodiments are not intended to limit the scope of the appended claims, and that not all the combinations of features described in the embodiments are necessarily essential to the present invention. Of a plurality of features described in the embodiments, two or more features may arbitrarily be combined. In addition, the same reference numerals denote the same or similar parts, and a repetitive description will be omitted.

First Embodiment

FIG. 1 is a block diagram showing the arrangement of a load receiving vehicle according to an embodiment of the present invention. A vehicle 1 is an automobile including a steering wheel 16, a steering actuator 15 including an electric motor that rotationally drives a steering shaft, a steering angle sensor 14 that detects the rotation angle (steering angle) of the steering shaft, an electronic control unit (to be referred to as "ECU" hereinafter) 10 that performs steering control and the like, front wheels 24F that change the direction in accordance with steering, an internal combustion engine or an electric motor that is a power source (not shown), an automatic transmission, an accelerator pedal, a brake pedal, and the like. In addition, a brake actuator 18 that actuates the brake, and a shift actuator 19 that changes the shift lever position of the automatic transmission are connected to the ECU 10. The detection signal of a shift position sensor 17 that detects the shift lever position of the automatic transmission is further input to the ECU 10. Note that if the power source is an internal combustion engine, the shift actuator 19 and the shift position sensor 17 also deal with a change in the deceleration ratio between the driving side and the driven side in addition to switching between forward movement and backward movement. On the other hand, if the power source is an electric motor, the shift actuator 19 need only be able to switch between forward movement and backward movement, and the shift position sensor 17 also need only be able to detect forward movement or backward movement. Additionally, a left wheel speed sensor 20L that detects a left wheel speed VWL and a right wheel speed sensor 20R that detects a right wheel speed VWR are provided near left and right rear wheels 24R. The detection signals of the wheel speed sensors are supplied to the ECU 10. A traveling speed VP of the vehicle is calculated as the average value of the left wheel speed VWL and the right wheel speed VWR.

This vehicle is also provided with a front camera 11F that acquires an image on the front side of the vehicle, a rear camera 11R that acquires an image on the rear side of the vehicle, a radar 12F directed to the front side of the vehicle, a radar 12R directed to the rear side of the vehicle, and sonars 13FL, 13FR, 13RL, and 13RR arranged at the four corners of the vehicle, for example, at the four corners of the front and rear bumpers that readily come into contact with an external object. Note that for the purpose of detecting a proximity object at the time of low-speed traveling, sonars may be provided at the central portion of the front and rear bumpers in place of the radars 12F and 12R. In addition, the cameras 11F and 11R may be omitted if the manner and range of vehicle movement are limited.

The ECU 10 includes an input circuit, an output circuit, a CPU, a storage circuit, and the like. Based on signals supplied from the sensors, the cameras 11F and 11R, the radars 12F and 12R, and the sonars 13FL, 13FR, 13RL, and 13RR, the ECU 10 recognizes the situation around the vehicle and performs steering control via the steering actuator 15, and also performs switching control (movement control) between forward movement and backward movement of the vehicle via the shift actuator 19 and performs stop control of the vehicle via the brake actuator 18. Additionally, the brake actuator 18 includes an actuator configured to not only drive a foot brake but also perform braking and release of a parking brake.

Furthermore, a cargo door key actuator 21 (to be abbreviated as a key actuator hereinafter) functions as a lock control unit configured to lock or unlock the door of a cargo loading portion serving as a load storage unit such as a trunk in accordance with control of the ECU 10. If security information called a virtual key or the like is received by the ECU 10 via, for example, a predetermined communication medium, for example, Bluetooth® and authenticated in accordance with a predetermined procedure, the key actuator 21 unlocks the door. Locking may be performed, for example, immediately after the door is closed or after the elapse of a predetermined time. Note that the cargo loading portion is not always the trunk or luggage room behind the seat, and may include a seat for a passenger if the seat for a passenger is used as a cargo loading portion.

Additionally, a communication control unit 23 controls communication with other devices via an antenna. The other devices include, for example, a server 201 and a user portable terminal 202 shown in FIG. 2B and other apparatuses. An in-vehicle terminal 22 is a terminal mounted in the vehicle 1, and performs visual or auditory output in accordance with a message from another device. The in-vehicle terminal 22 may be used as an input/output device for control of the vehicle 1 or another purpose, for example, output of a message from the vehicle 1 or setting and display of a navigation system. Furthermore, the vehicle 1 may include a GPS system configured to specify the position of the vehicle. This makes it possible to receive GPS signals from satellites and specify the position of the self-vehicle.

Figure 2A:
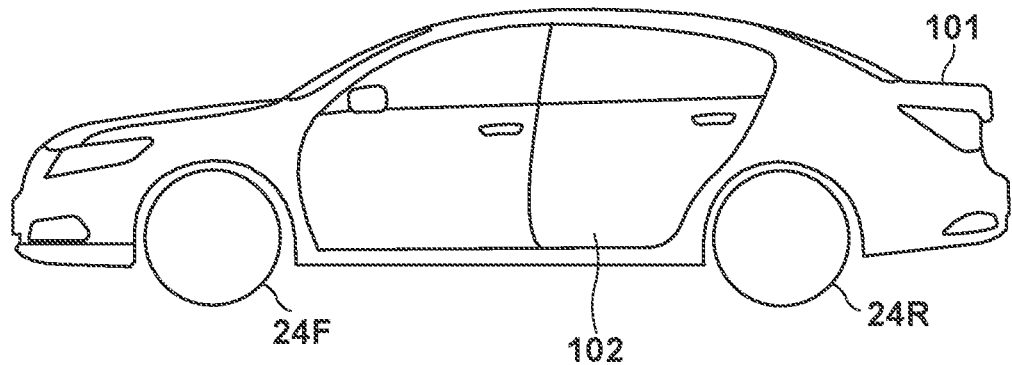
FIG. 2A is a side view of the load receiving vehicle.

FIG. 2A is a side view of the vehicle 1. This vehicle is an example of a vehicle that includes a trunk 101 in the rear portion as a cargo loading portion. The lid portion (cargo door) of the trunk 101 can be opened/closed, and a cargo can be stored inside. The trunk 101 can be locked or unlocked by the key actuator 21, and when locked, can be opened only when a key (or a virtual key) corresponding to the lock is used. Note that the shape of the vehicle body is not limited to a so-called sedan type with a trunk, and may be of a type including a hatchback-shaped door in the rear portion. Alternatively, the lock of a door 102 for an occupant may be opened/closed to use the cabin as the cargo loading portion.

Figure 2B:
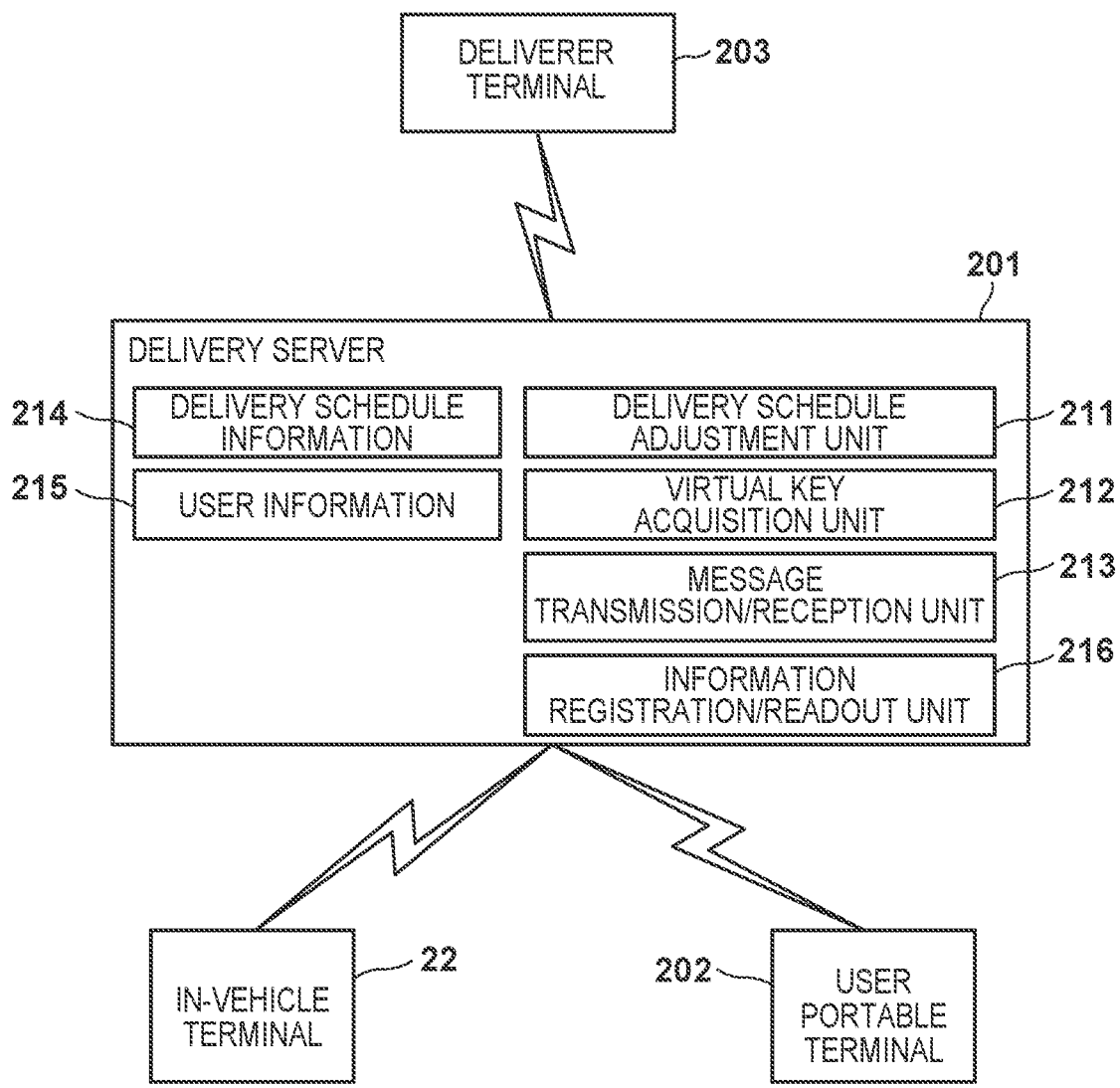
FIG. 2B is a block diagram of a delivery system.

FIG. 2B shows the arrangement of a delivery system according to this embodiment. The delivery server 201 communicates with a deliverer terminal 203, the user portable terminal 202, and the in-vehicle terminal 22, adjusts a delivery schedule, and transmits the delivery schedule to each terminal. The delivery server 201 holds delivery schedule information 214 that associates a delivery time, a delivery destination, and the like with each load of target, and user information 215 that accumulates information concerning the user at the delivery destination, for example, the address of the user, information of a vehicle owned by the user, and the like. Additionally, to provide the function of the delivery server, the delivery server 201 includes a delivery schedule adjustment unit 211 that adjusts the delivery schedule, a virtual key acquisition unit 212 that acquires a virtual key used to open the cargo loading portion of the vehicle from the user portable terminal 202 or the like, a message transmission/reception unit 213 configured to exchange a message with each terminal, an information registration/readout unit 216 that accesses delivery schedule information or user information and registers, changes, or reads out the information, and the like. Note that each of the server and the terminals is implemented by a computer including a processor and a memory, and executes the function by executing a program stored in the memory and processing or inputting/outputting data. In particular, the terminals may include a touch panel or the like as an interface to a user.

Figure 3B:
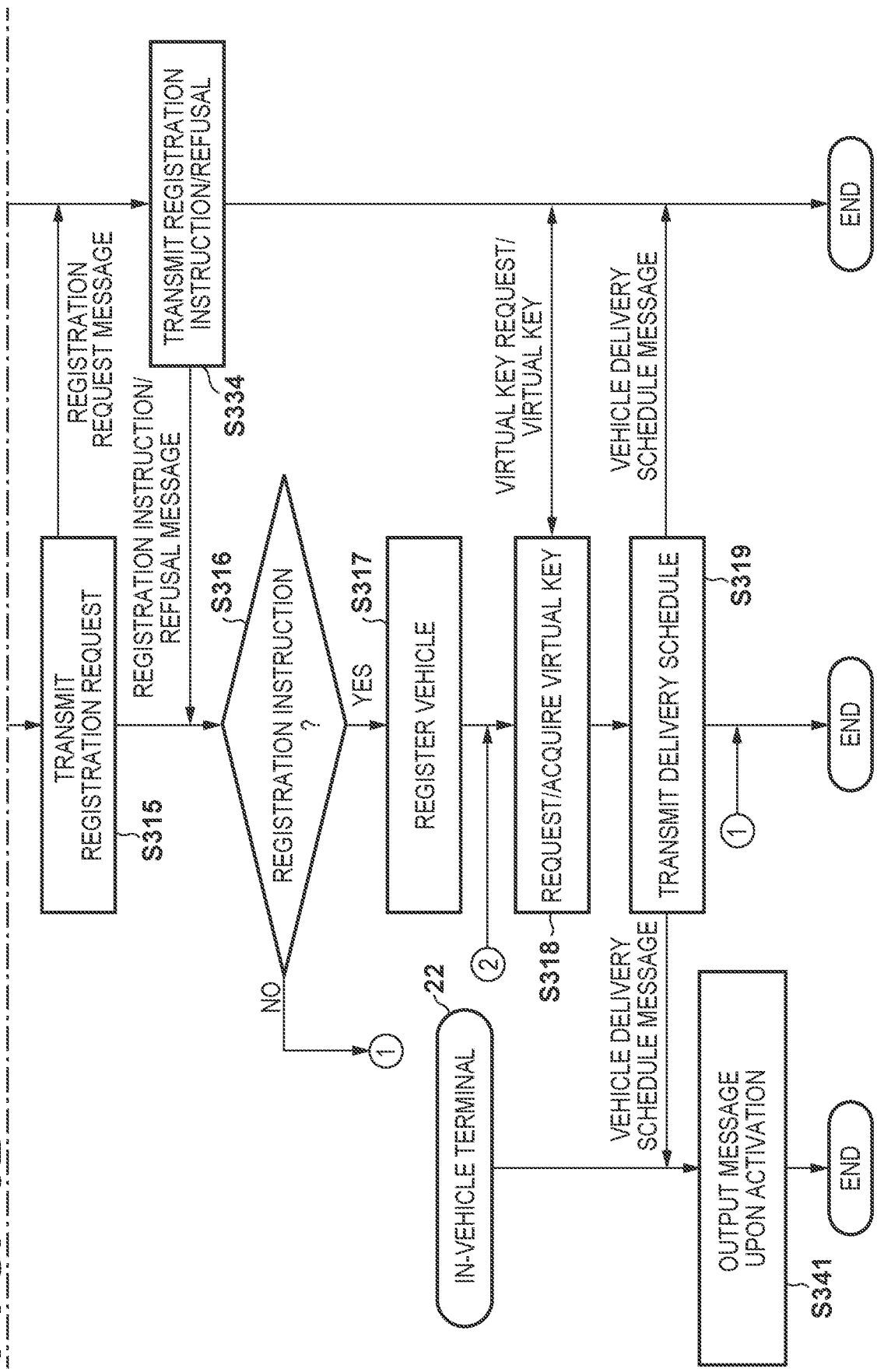

FIGS. 3A and 3B shows an example of the processing procedure of load delivery executed on the arrangement shown in FIGS. 1 and 2B. Note that in the following explanation, in the delivery server 201, delivery schedule information and user information are stored in the delivery schedule information 214 and the user information 215, respectively. In addition, adjustment for delivery is performed by the delivery schedule adjustment unit 211, request and acquisition of a virtual key are performed by the virtual key acquisition unit 212, message exchange with a terminal is performed by the message transmission/reception unit 213, and saving of received information and readout of saved information are performed by the information registration/readout unit 216. First, the deliverer transmits, by the deliverer terminal 203, delivery schedule information to the delivery server 201 (step S301). The delivery schedule information includes, for example, information such as the address and name of the destination and a scheduled delivery date/time. Note that the delivery schedule information may be input from, for example, another input terminal. Upon receiving the delivery schedule information, the delivery server 201 adjusts the delivery schedule (step S311). The adjustment may be done in consideration of, for example, the delivery destination or other delivery articles.

Once the delivery schedule is adjusted and decided, the delivery server 201 stores it and also transmits a user delivery schedule message to the user portable terminal 202 of the user of the delivery destination (step S312). The transmission destination may be included in the delivery schedule information. The user delivery schedule message includes, for example, the scheduled delivery date/time and place, and may further include information used to display a dialogue for asking whether to deliver to a vehicle. The user delivery schedule message may further include a dialogue for designating a place and a date/time by the destination user. In this embodiment, focus is placed on whether to perform delivery to a vehicle. When the use who has confirmed those pieces of information returns a response concerning whether to perform delivery to a vehicle in the displayed dialogue, the response information is transmitted as a message on whether to perform delivery to the delivery server 201 (step S332).

Upon receiving the message on whether to perform delivery, the delivery server 201 determines whether a delivery permission to a vehicle is included in the message on whether to perform delivery, that is, whether a delivery instruction to a vehicle is included (step S313). If the delivery permission is included, the delivery server 201 determines whether information concerning the vehicle of the transmission source user is already registered in the user information 215 (step S314). On the other hand, if the delivery permission is not included, the processing is ended. If the delivery schedule is changed as the result of adjustment in step S311, the adjusted schedule is transmitted to the deliverer terminal.

If the vehicle is not already registered, a registration request message of the information concerning the vehicle is transmitted to the user portable terminal 202 (step S315). Upon receiving the registration request message, the user portable terminal 202 displays a dialogue corresponding to the received message. If the user inputs information necessary for registration of the vehicle and a registration instruction in the screen, a registration instruction message is transmitted to the delivery server 201 (step S334). The information necessary for registration may include, for example, the registration number of the vehicle, the color and type that are the appearance features, and the model. If the user refuses to provide vehicle information, he/she inputs this, and the user portable terminal 202 returns a message representing the refusal.

Upon receiving the response from the user portable terminal 202, the delivery server 201 determines whether an instruction of registration of vehicle information is included in the response (step S316). If the registration instruction is included, the vehicle information included in the response is registered in the user information 215 (step S317). On the other hand, if the registration instruction is not included in the response, the delivery instruction to the vehicle is disabled, and the processing is ended. In this case, delivery to the home is performed in accordance with the original delivery schedule.

After the registration of the vehicle or if the vehicle is already registered, the virtual key of the vehicle is requested of the user portable terminal 202 and acquired. The virtual key is information serving as an electronic key used to unlock the door of the cargo loading portion of the vehicle. If the virtual key is input to the vehicle, and authentication is succeeded, the door is unlocked. The virtual key may be authenticated by the vehicle, or may be transferred to a specific server and authenticated. When the virtual key is acquired, preparation for delivery to the vehicle is completed. Hence, a vehicle delivery schedule message is transmitted to the user portable terminal 202 and the in-vehicle terminal 22 (step S319). The delivery schedule message is also transmitted to the deliverer terminal 203 of the deliverer who delivers the target load and received (step S302). The delivery schedule message includes the scheduled delivery date/time and information representing the delivery to the vehicle. Furthermore, the message to the deliverer terminal 203 includes information used to identify the vehicle serving as a load container and the virtual key.

For example, if the vehicle is active, the in-vehicle terminal 22 that has received the vehicle delivery schedule message makes a notification at that time by outputting a notification representing that there is delivery to the vehicle. If the vehicle is not active, the in-vehicle terminal 22 makes a notification when the vehicle is activated next time, thereby providing the information to the driver (step S341). In addition to the scheduled delivery date/time, the information may include a message that urges the user to park in a state in which a space is ensured around the vehicle such that the door of the cargo loading portion can be opened. The information may further include a message that urges the user to park such that the door of the cargo loading portion, for example, the trunk faces, for example, the road side such that the deliverer can easily access. This is a particularly effective message if the vehicle is parked in a garage. Furthermore, the message may be output by the user portable terminal 202. This can notify the user of the schedule to receive the delivery article by the vehicle even if the in-vehicle terminal is not provided in the vehicle.

On the other hand, the deliverer of the load proceeds to the destination in accordance with the delivery schedule, and as for the load for which the vehicle is designated as the delivery destination, specifies the vehicle based on information concerning the features of the vehicle, which is already received in association with the load, and unlocks the lid of the cargo loading portion using the virtual key. After that, the deliverer opens the lid, stores the load, and closes the lid. In this example, when the lid is closed, the door is locked. At this time, in the vehicle 1, the virtual key used once may be disabled. The disabling timing may be, for example, immediately after the first use or after the elapse of a predetermined time of 5 min from the first use.

With the above-described procedure, according to this embodiment, since a vehicle can be used as a home delivery container, delivery can be performed safely even if the user is absent. In addition, since the recipient of the delivery article is notified of the scheduled delivery date/time and the message representing that there is delivery to the vehicle and that a space for opening/closing the cargo loading portion needs to be ensured, more reliable reception is possible. Furthermore, when the message is notified from the vehicle during driving of the vehicle, more reliable reception of the load can be implemented.

Note that in this embodiment, the vehicle 1 only receives and outputs messages, and therefore, need only cope with unlock by the virtual key and processing of a received message by the in-vehicle terminal. For this reason, sensors such as cameras and sonars for automatic parking and actuators for steering and throttle control may not be provided in the vehicle. In addition, the in-vehicle terminal 22 is preferably in a standby state such that it can receive a message even if the vehicle is off. Furthermore, if a navigation device is mounted in the vehicle 1, message output by the in-vehicle terminal is performed in a case in which it is determined that the vehicle 1 is at the position of home registered in advance. This can promote parking at a position or in a direction more suitable for reception of the load.

Second Embodiment

The second embodiment basically follows the first embodiment except that control in a case in which a vehicle 1 has an automatic parking function is performed. Hence, the control sequence of the entire system is the same as in FIGS. 3A and 3B, and control of the vehicle 1 including an in-vehicle terminal 22 is different from step S341 of the first embodiment.

FIG. 4 shows a procedure executed by the vehicle 1, particularly, an ECU 10 in this embodiment in addition to step S341 of FIG. 3B. The procedure shown in FIG. 4 is executed when, for example, it reaches a predetermined time before the scheduled delivery date/time. The in-vehicle terminal 22 that has received a vehicle delivery schedule message executes step S341, and transfer a portion of the received information necessary for control of the vehicle to the ECU 10. At this time, if the power of the vehicle 1 is off, the ECU 10 is also inoperative. Hence, before transfer of the information, power supply to the control unit including at least the ECU 10 is started. The vehicle 1, particularly, the ECU 10 that has received the information sets an activation timer, for example, a predetermined time before the scheduled delivery date/time, and the vehicle 1 is powered on when the timer is time-out. After that, the processing shown in FIG. 4 is executed to control the vehicle. First, it is determined whether the vehicle has the automatic parking function (step S401). In many cases, the automatic parking function is provided as an option. Whether the automatic parking function is prepared can be, for example, stored in a non-volatile memory provided in the ECU 10 or indicated by a switch or the like. Hence the presence/absence of the function can be determined by referring to this.

Upon determining that the automatic parking function is provided, it is determined, by, for example, detecting an obstacle on the periphery by a detection unit such as a sonar 13 or a radar 12, whether the door of the cargo loading portion is in a state in which it can be opened (step S403). For example, if no obstacle is detected in the door open direction, or if the obstacle is apart for the vehicle by a predetermined distance or more, it can be determined that the door can be opened. Upon determining that the door cannot be opened, it is determined whether the vehicle can be moved to a position where the door can be opened (step S405). In this determination, if an obstacle that impedes opening of the door of the cargo loading portion even if the vehicle is moved to a limit is detected before or after the vehicle, or if control beyond the automatic parking function is required, it can be determined that the vehicle cannot be moved.

Upon determining that the vehicle can be moved, the driving unit of the vehicle is activated, and the vehicle is moved using the automatic parking function to a position where the door opens (step S407). For example, if it is determined that the door of the rear portion cannot be opened because of an obstacle, the vehicle is moved to the front side. If a more advanced automated driving function is provided, the front-and-rear direction of the vehicle may be reversed, or the vehicle may be moved to a position to more easily access. When moving the vehicle in step S407, a warning may be given to the periphery by, for example, turning on the headlight, sounding the horn, or outputting a voice message. After the end of the preparation procedure, the power of the vehicle 1 is returned to off.

According to the above-described embodiment, it is possible to not only notify the user of the schedule of load delivery but also move the vehicle to a position and in a direction suitable for reception of a load at an appropriate timing using the automatic parking function or automated driving function.

Third Embodiment

Figure 5A:
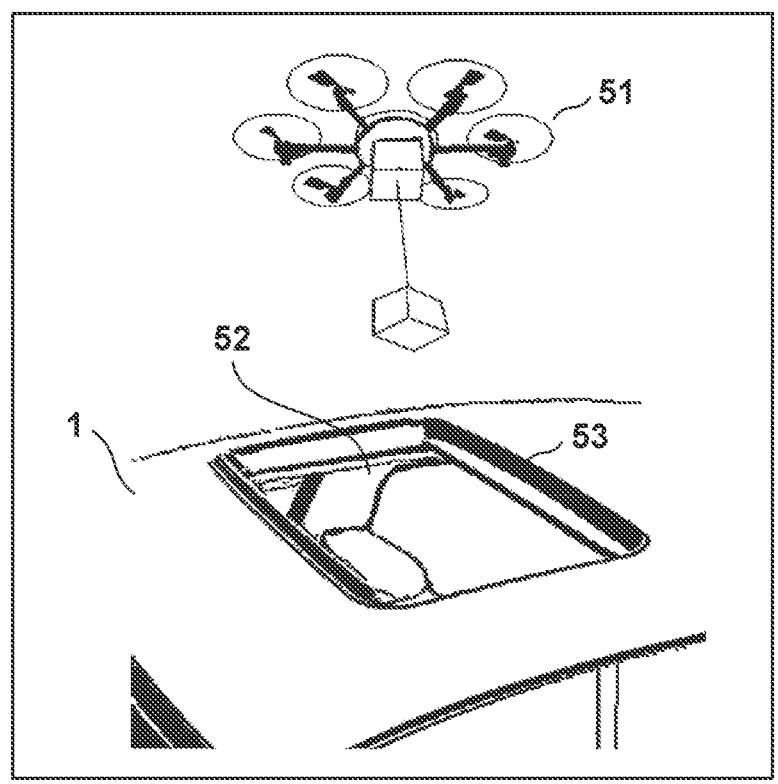
FIGS. 5A and 5B are views showing an arrangement according to the third embodiment.
Figure 5B:
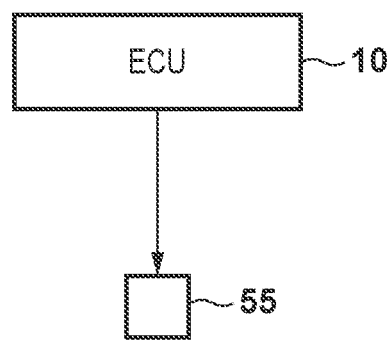

The third embodiment based on the first embodiment will be described next. A description of portions common to the first embodiment will be omitted. In this embodiment, as shown in FIG. 5A, a load delivered by a drone 51 flying by automatic control is received and stored through a sun roof 52 provided in the roof of a vehicle 1 in place of the trunk of the vehicle 1. For this reason, the vehicle 1 according to this embodiment includes the sun roof 52 whose door 53 is opened/closed by a motor 55 controlled by an ECU 10, as shown in FIG. 5B. Note that the arrangement shown in FIG. 5B is an arrangement further added to the arrangement shown in FIG. 1. When opening the sun roof 52, authentication may be performed by a virtual key according to the first embodiment. Alternatively, authentication may be performed using authentication information (the virtual key and the authentication information will be referred to as authentication information together) for sun roof because the trunk or door need not be opened. The authentication information at that case may be generated in accordance with a predetermined procedure based on, for example, user information already registered as user information 215 or may be exchanged in advance in accordance with a secure procedure.

The drone 51 autonomously flies from a base to a set destination, delivers a load, and returns to the base. The drone 51 hangs the load by a windable rope such that the load can be moved up and down, and holds the load by a hook or the like that can remotely be released such that the load can be put down in a hovering state. The drone 51 may be provided with a structure that sandwiches a side surface of the load to prevent the load from swinging. The drone 51 that has reached over the target vehicle transmits authentication information and requests the vehicle to open the sun roof. At this time, the drone 51 may recognize the sun roof whose door 53 is opened from, for example, a ground image captured by a camera or the like, and specify the vehicle. Upon receiving the authentication information, the vehicle 1 opens the sun roof. The drone puts down the load, puts the load in the vehicle through the sun roof, releases the hanging hook, and winds up the rope. When the rope is wholly wound, the vehicle 1 is requested to close the sun roof 52. The vehicle 1 that is requested closes the door 53 to close the sun roof 52.

This is the outline of this embodiment. In this embodiment, the deliverer of the load is not a human but a drone, and the load is delivered from the air. For this reason, the message transmitted in step S319 from a delivery server 201 to the user who is the recipient of the vehicle includes information representing that the load is delivered by the drone through the sun roof. This message may further include a message that urges the user to park the vehicle in a place where no obstacle exists in the air. The message transmission timing and the control procedure are the same as in the first embodiment except that the message transmitted to a user portable terminal 202 in step S312 includes asking the user to confirm whether reception through the sun roof is possible.

Figure 6A:
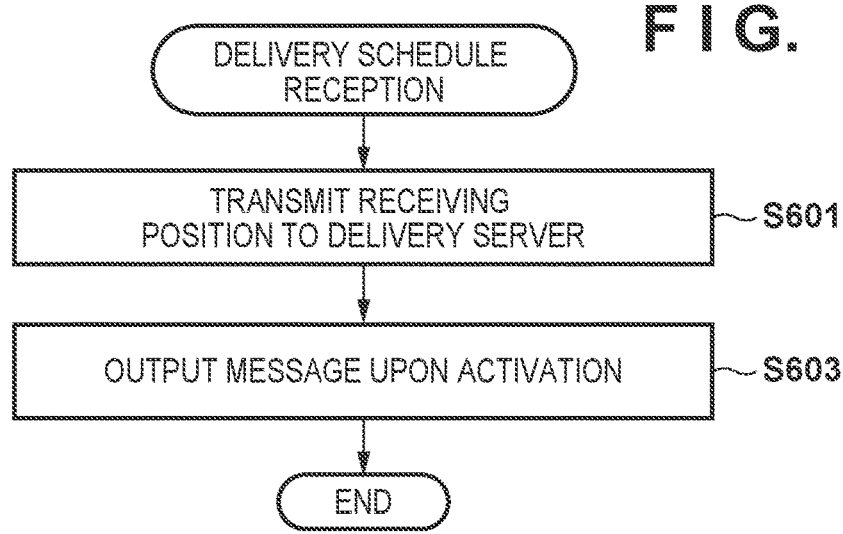
FIGS. 6A and 6B are flowcharts of a delivery acceptance preparation procedure by a load receiving vehicle according to the third embodiment.
Figure 6B:
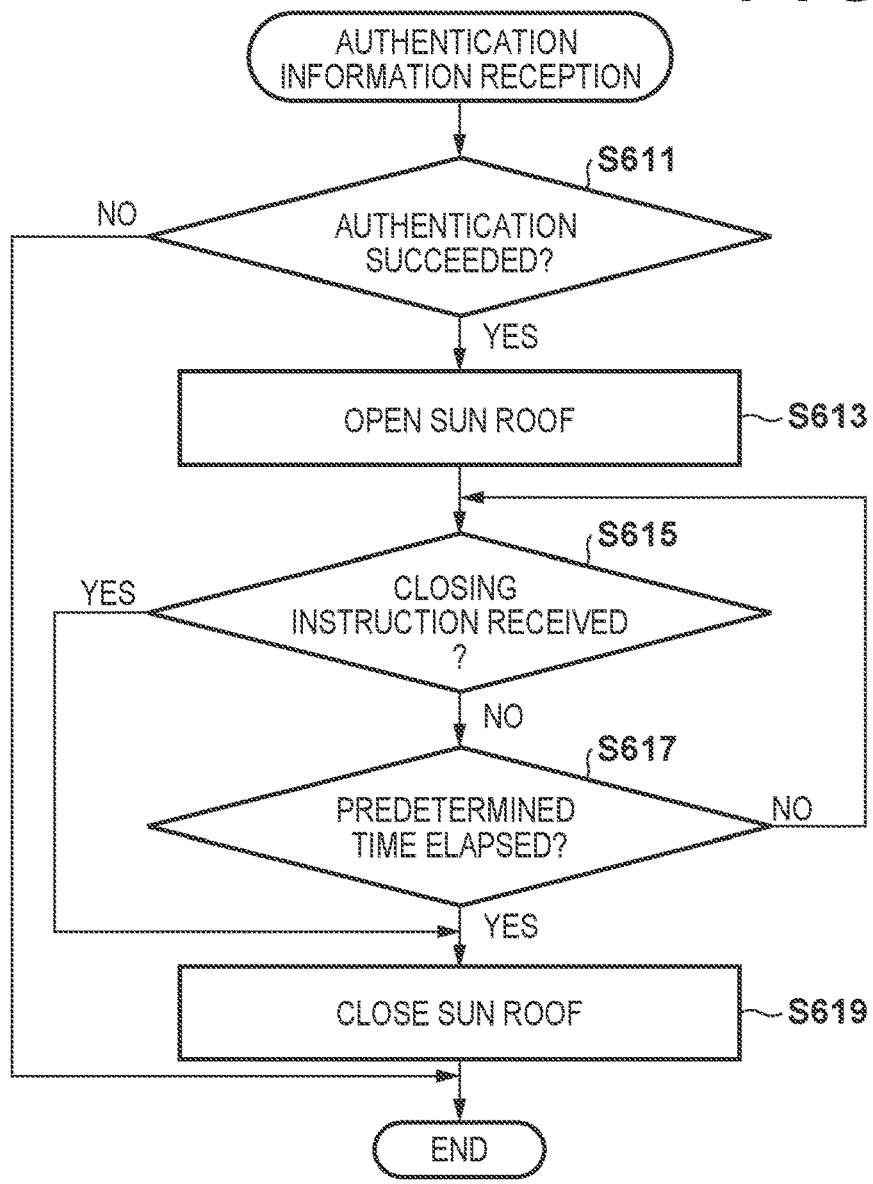

FIGS. 6A and 6B show procedures specific to this embodiment. FIG. 6A shows the procedure of an in-vehicle terminal 22 that has received a delivery schedule in step S319 of FIG. 3B, and FIG. 6B shows the operation procedure of the vehicle 1 that has received authentication information from the drone that has reached over the vehicle 1. The in-vehicle terminal 22 that has received the delivery schedule transmits a load receiving position to the delivery server 201 (step S601). That is, the position where the vehicle 1 exists at the scheduled delivery time of the load is transmitted. This position may be a current position. However, for example, the position of a home parking area may be registered and transmitted. Note that as the current position, a position specified by GPS signals or the like may be acquired from a navigation device. To further raise accuracy, the position may be corrected by a signal from a fixed ground station. Step S603 is the same process as step S341 shown in FIG. 3B. In this way, the delivery server 201 can be notified of the load receiving position.

The in-vehicle terminal 22 that has received the authentication information from the drone 51 operates in accordance with the procedure shown in FIG. 6B. Note that in FIG. 6B, since a device in the vehicle is controlled, communication may be performed via a communication device for vehicle control without an intervention of the in-vehicle terminal 22. When the authentication information is received, it is transferred to the ECU 10. By the authentication information, the ECU 10 authenticates the drone 51 that is the transmitter of the authentication information (step S611). When the authentication is succeeded, the motor 55 is driven to open the door 53 under the control of the ECU 10 (step S613). After that, the processing waits for reception of a close instruction to close the door 53 of the sun roof from the drone 51 (step S615). To prevent the sun roof from being kept open even if the close instruction is not received, it is determined whether a predetermined time has elapsed from the open (step S617). If the close instruction is received, or the predetermined time has elapsed, the door 53 is driven to close the sun roof 52 (step S619). The load can thus be received.

Note that load reception by the drone can be performed using not the sun roof but the trunk of a sedan-type vehicle. To do this, however, an automatic opening/closing mechanism is needed for the trunk. Including such a mechanism provided in the vehicle 1, a notification is made to the delivery server 201 by, for example, the message on whether to perform delivery in step S332 of FIG. 3A. In addition, specifying of the vehicle position by the drone 51 is the technique on the drone side. However, for example, the vehicle 1 may guide the drone by generating beacons a predetermined time before the scheduled delivery time. As described above, according to this embodiment, both the side to deliver the load and the side to receive can be unattended, and the received load can safely be ensured.

Fourth Embodiment

Figure 7A:
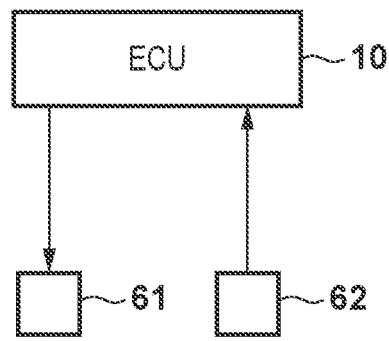
FIG. 7A is a view of the arrangement of a load receiving vehicle according to the fourth embodiment.

An embodiment that allows a user to receive a delivery load even if it is an article requiring refrigeration will be described next. In this embodiment, a refrigerating container is provided in a vehicle 1, and a load is stored in it. FIG. 7A shows an arrangement for this. However, the container itself is not illustrated. In addition to the arrangement shown in FIGS. 3A and 3B, an ECU 10 controls driving of a compressor 61, and detects the temperature in the storage container by a temperature sensor 62 in the container. The delivery load is stored in the refrigerating container.

Figure 7B:
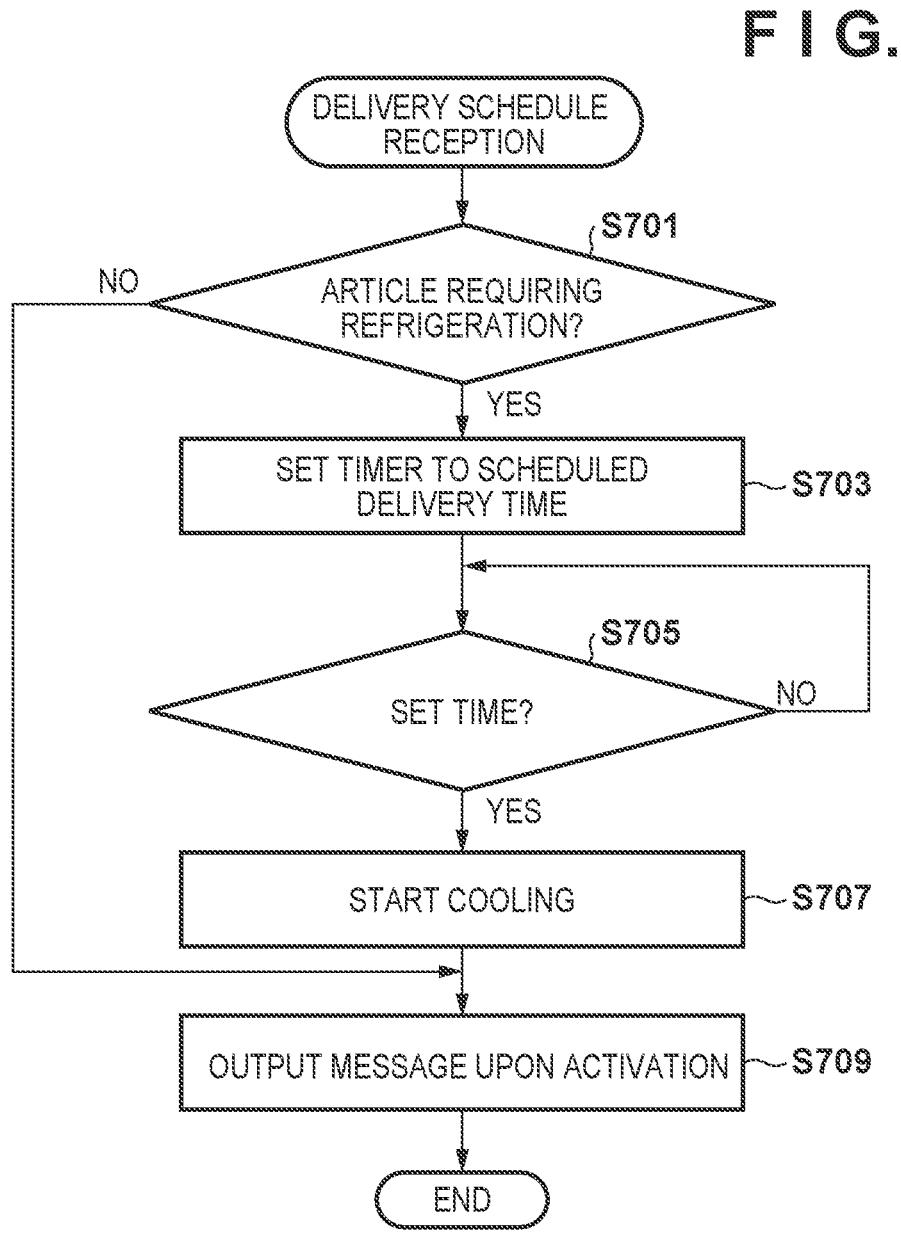
FIG. 7B is a flowchart of a delivery acceptance preparation procedure.

FIG. 7B shows the operation procedure of an in-vehicle terminal 22 that has received delivery schedule information in step S319 of FIG. 3B. In this embodiment, delivery schedule information includes display concerning whether the load scheduled to be delivered is an article requiring refrigeration. When delivery schedule information is received, it is transferred to the ECU 10. The ECU 10 first determines whether the load scheduled to be delivered is an article requiring refrigeration (step S701). If the load requires refrigeration, a timer is set to the scheduled delivery time, and the processing waits for time-out of the timer (step S703). Note that here, a time predetermined time before the scheduled time may be set such that the temperature reaches the refrigerating temperature at the scheduled delivery time. The refrigerating temperature may be included in the delivery schedule information, but may be determined to a predetermined temperature. If the timer reaches the set time (Y in step S705), the compressor 61 is driven to start cooling (step S707). When refrigerating, the ECU 10 detects the temperature by the temperature sensor 62, and if the temperature reaches the set temperature, on/off-controls the compressor to control the temperature. Finally, when the vehicle 1 is activated, a message is output (step S709). This message notifies that a refrigerated article is scheduled to be delivered, and the scheduled time.

In the above-described way, in this embodiment, the article requiring refrigeration can be received. Furthermore, when the container is precooled, the quality of the article requiring refrigeration can be prevented from lowering. Note that in the above-described example, a container for refrigeration is used. However, for example, an entire trunk may be used as a refrigerating container. Additionally, in this embodiment, a compressor for refrigeration is used. However, a compressor for in-vehicle air conditioner may be used. In this case, cold air is circulated by passing a duct for air conditioning through the trunk or the storage container. For this purpose, each of a duct to the cabin and a duct to the container may be provided with an electric valve controlled by the ECU 10. Control may be done to close the valve to the container when the ducts are used for normal air conditioning, and close the valve to the cabin when the ducts are used for refrigeration. Additionally, if a load is received from a sun roof, as described in the third embodiment, the cabin serves as the place to store the load. Hence, cooled air may be circulated to the cabin using a normal air conditioner. In this case as well, precooling may be performed such that a predetermined temperature is set a predetermined time before the scheduled delivery time. If the storage container is small, for example, a Peltier element may be used for cooling in place of the compressor. Since the first to fourth embodiments are not contradictory, an arbitrary combination of them can also be executed.

Summary of Embodiments

The above-described embodiments are summarized as follows.

(1) According to the first aspect of the present invention, the present invention is a load receiving vehicle characterized by comprising:
- a storage unit usable as a receiving place of a delivery article;
- a lock control unit capable of controlling lock and unlock of a door of the storage unit; and
- a communication unit,
- wherein if the communication unit receives delivery schedule information representing a delivery schedule to the load receiving vehicle, information based on the delivery schedule information is provided to a driver.

With this arrangement, when the vehicle is used as a home delivery container, the driver of the container is notified of it, thereby enabling more reliable reception.

(2) According to the second aspect of the present invention, the present invention is the load receiving vehicle according to (1), characterized in that
- the information based on the delivery schedule information is provided to the driver in response to activation of the load receiving vehicle before a scheduled delivery date/time included in the delivery schedule information after the delivery schedule information is received.

With this arrangement, the driver can more reliably be notified of the delivery schedule.

(3) According to the third aspect of the present invention, the present invention is the load receiving vehicle according to (1) or (2), characterized by further comprising detection unit configured to detect an obstacle on the periphery of the vehicle, wherein after the delivery schedule information is received, the information based on the delivery schedule information is provided to the driver if the detection unit detects an obstacle that impedes opening/closing of the door of the storage unit when parking the load receiving vehicle before the scheduled delivery date/time included in the delivery schedule information.

With this arrangement, if the vehicle exists at a position difficult to store the load, reliable load reception can be implemented by making a notification.

(4) According to the fourth aspect of the present invention, the present invention is the load receiving vehicle according to any one of (1) to (3), characterized by further comprising driving control unit for automated driving of the load receiving vehicle, wherein after the delivery schedule information is received, the driving control unit moves the load receiving vehicle to a position where the obstacle that impedes opening/closing of the door of the storage unit does not exist a predetermined time before the scheduled delivery date/time included in the delivery schedule information.

With this arrangement, if a schedule of delivery to the load receiving vehicle exists, the load can more reliably be received by moving the vehicle to an appropriate place.

(5) According to the fifth aspect of the present invention, the present invention is the load receiving vehicle according to any one of (1) to (4), characterized in that the information to the driver includes a message that urges the driver to park such that the door of the storage unit can easily be opened/closed.

With this arrangement, the opening/closing of the door is facilitated, and the load can more reliably be received.

(6) According to the sixth aspect of the present invention, the present invention is the load receiving vehicle according to any one of (1) to (5), characterized in that the lock control unit unlocks the door in accordance with input of information serving as a virtual key for unlock of the door of the storage unit.

With this arrangement, it is possible to reliably transfer the key for unlock and more reliably receive the load.

The present invention is not limited to the above embodiments, and various changes and modifications can be made within the spirit and scope of the present invention. Therefore, to apprise the public of the scope of the present invention, the following claims are made.

What is claimed is:

1. A delivery management system for delivering a delivery article to a vehicle having a cargo loading portion, the delivery management system comprising:
   a delivery server and an in-vehicle terminal, wherein the delivery server comprises:
   at least one processor; and
   at least one memory which stores at least one program that causes the at least one processor to perform:
   receiving a delivery scheduling information from a deliverer terminal;
   adjusting the delivery schedule;
   transmitting to a user terminal inquiry information including the adjusted delivery schedule information asking whether to deliver to a vehicle;
   receiving information designating a vehicle as the delivery destination for a delivery article from a user terminal in response to the inquiry information; and
   transmitting delivery scheduling information by which the vehicle has been designated as the delivery destination of the delivery article to the in-vehicle terminal of the vehicle designated as the delivery destination,
   wherein the in-vehicle terminal outputs a message based on the delivery scheduling information to the user of the vehicle when the vehicle is activated.

2. The delivery management system according to claim 1, wherein
   the delivery scheduling information includes at least one of scheduled delivery date and time, the delivery destination, and requirement of refrigeration of the delivery article.

3. The delivery management system according to claim 1, wherein
   the delivery scheduling information includes the scheduled delivery date and time, and
   the providing provides information to the user of the vehicle when the vehicle is activated before the scheduled delivery date and time.

4. The delivery management system according to claim 1, further comprising:
   a detector that detects an obstacle on the periphery of the vehicle, wherein
   the providing provides information to the user of the vehicle when the detector detects an obstacle when the user parks the vehicle.

5. The delivery management system according to claim 4, wherein
   the at least one program causes the at least one processor to perform:
   determining whether an obstacle detected by the detector prevents a door of the cargo loading portion from opening and closing, and wherein
   the providing provides information to the user of the vehicle when the determining determines that the obstacle prevents a door of the cargo loading portion from opening and closing when the user parks the vehicle.

6. The delivery management system according to claim 1, wherein
   the providing provides, to the user of the vehicle, information including a notification which urges the user to park such that the door of the cargo loading portion can be opened and closed easily.

7. The delivery management system according to claim 1, wherein
   the at least one program causes the at least one processor to perform:
   generating virtual key information for locking and unlocking the door of the cargo loading portion,
   transmitting the virtual key information to at least the vehicle, and
   unlocking the vehicle based on the virtual key information.

8. A delivery management method, comprising:
   receiving a delivery scheduling information from a deliverer terminal;
   adjusting the delivery schedule;

transmitting to a user terminal inquiry information including the adjusted delivery schedule information asking whether to deliver to a vehicle;
designating the vehicle as the delivery destination for a delivery article;
by the vehicle, receiving in an in-vehicle terminal of the vehicle the delivery scheduling information by which the vehicle has been designated as the delivery destination of the delivery article; and
providing information based on the delivery scheduling information to a user of the vehicle.

* * * * *